US011034557B2

(12) United States Patent
Hartke

(10) Patent No.: US 11,034,557 B2
(45) Date of Patent: Jun. 15, 2021

(54) RAIL-GUIDED LIFTING DEVICE

(71) Applicant: Christopher Hartke, Teutopolis, IL (US)

(72) Inventor: Christopher Hartke, Teutopolis, IL (US)

( * ) Notice: Subject to any disclaimer, the term of this patent is extended or adjusted under 35 U.S.C. 154(b) by 357 days.

(21) Appl. No.: 16/024,537

(22) Filed: Jun. 29, 2018

(65) Prior Publication Data

US 2019/0002252 A1 Jan. 3, 2019

Related U.S. Application Data

(60) Provisional application No. 62/526,949, filed on Jun. 29, 2017.

(51) Int. Cl.
| | |
|---|---|
| *B66C 19/00* | (2006.01) |
| *A01K 29/00* | (2006.01) |
| *A22B 7/00* | (2006.01) |
| *B66D 1/48* | (2006.01) |
| *B66C 11/06* | (2006.01) |
| *B66C 1/16* | (2006.01) |

(52) U.S. Cl.
CPC .............. *B66C 19/00* (2013.01); *A01K 29/00* (2013.01); *A22B 7/006* (2013.01); *B66C 1/16* (2013.01); *B66C 11/06* (2013.01); *B66D 1/48* (2013.01); *B66D 1/485* (2013.01)

(58) Field of Classification Search
CPC .......... B66C 1/16; B66C 11/06; B66C 19/00; A22B 7/002; A22B 7/003; A22B 7/004; A22B 7/006; B66D 1/48; B66D 1/485; A01K 29/00
See application file for complete search history.

(56) References Cited

U.S. PATENT DOCUMENTS

| | | | | |
|---|---|---|---|---|
| 2,702,139 A * | 2/1955 | Faustine | ................ | B66C 19/02 414/461 |
| 3,750,811 A * | 8/1973 | Anderson | ............... | B66C 19/02 414/460 |
| 3,805,967 A * | 4/1974 | Scannell | .............. | B66C 19/005 212/323 |
| 3,863,418 A * | 2/1975 | Faucheux | ........... | E04B 1/34807 52/745.04 |
| 4,149,369 A * | 4/1979 | Smetz | ....................... | B66C 1/36 24/116 R |
| 4,861,219 A * | 8/1989 | Mayle | ...................... | B62B 3/04 414/469 |
| 5,240,298 A * | 8/1993 | Teaby | ...................... | B66C 1/12 294/67.5 |

(Continued)

*Primary Examiner* — Dean J Kramer
(74) *Attorney, Agent, or Firm* — Singleton Law Firm, P.C.

(57) ABSTRACT

A lifting device is provided, the lifting device providing a cable and a powered winch which winds and unwinds the cable. Each end of the cable provides a slack-adjustable point of attachment to a load. The points of attachment may each be attached to an opposing end of a load, such that each point of attachment provides a counterweight to the other point of attachment. Slack between the points of attachment may be tensed by a bridging connector. The lifting device may lift a load by two lateral points of attachment such that the load may be elevated off a floor with minimal vertical clearance, and may be laterally actuated by casters hanging on a suspended rail.

17 Claims, 8 Drawing Sheets

(56) References Cited

U.S. PATENT DOCUMENTS 5,820,455 A * 10/1998 Breedlove ................ A22B 5/06
452/187
7,021,427 B2 * 4/2006 Skovgaard ........... A61G 7/1015
187/281

* cited by examiner

RAIL-GUIDED LIFTING DEVICE

CROSS-REFERENCE TO RELATED APPLICATIONS

The present application claims the benefit of U.S. Provisional Patent Application No. 62/526,949, filed Jun. 29, 2017, the content of which is hereby incorporated by reference in its entirety.

BACKGROUND OF THE INVENTION

In agriculture, livestock may be kept and fed in large indoor pen facilities. Over the course of this process, individual livestock may die from disease, resulting in a need to remove carcasses from the facility. Failure to remove carcasses on a timely basis may compromise the sanitation and biosecurity of the facility. In pen facilities having expansive floor space, if each livestock's body weight is heavier than a human handler's body weight, manual removal of carcasses or non-ambulatory live animals may be highly impractical and dangerous due to encumbrance. The use of motorized vehicles for such transport is also likely to be impractical in facilities dedicated to animal pens, due to limited traversable floor space. These considerations are particularly pertinent to swine-keeping facilities, since adult swine may weigh 300-600 pounds each.

The increasingly large size of most modern production confinement operations provides narrow alleyways, sharp corners, and long distances to a single exit point. Standard operating procedures for many modern animal production systems designate limited access into or out of the facilities to enhance the biosecurity of the operations, leaving only a predetermined exit for the removal of the dead or non-ambulatory animals.

Travis Mfg. of Curlew, Iowa has developed a rail-mounted trolley for hoisting pig carcasses. The Travis device includes a wheeled trolley that moves along a suspended rail, carrying a winch that lifts a pig carcass by the attachment of a cable to the rear legs of the carcass. The Travis device provides a hand-held control for an electrical battery-powered hoist.

The suspended rail of the Travis device is a steel beam. Thus, the rail of the Travis device must be straight along its length, since it is not known in the art to manufacture curved steel beams. Thus, the trolley of the Travis device cannot travel along a path that is not straight. Moreover, since the Travis device only lifts a carcass by one end, the Travis device requires sufficient vertical clearance below to accommodate hanging the full height of a swine carcass. This greatly constrains the installation of the Travis device in a facility, as the suspended rail must be above average human height in order to provide such vertical clearance.

Furthermore, the operation and maintenance of the Travis device is made cumbersome by the device's required elevation. The trolley must operate at an elevation above a user's head, and, thus, will be out of reach from floor-level for purposes of installation, removal, cleaning, and maintenance. Consequently, the hand-held control provided by the Travis device must be either decoupled from the trolley of the Travis device to prevent accidental damage or injury from the control and the trolley pulling apart, or the control must be coupled to the trolley by an extended cord, which itself presents a safety hazard.

There remains a need for an improved device adapted to the removal of swine carcasses from large pen facilities.

DETAILED DESCRIPTION OF THE INVENTION

Embodiments of the present invention provide a rail-guided lifting device. A lifting device according to embodiments of the present invention provides a frame to which are mounted a winch, a cradle, casters, and pulleys. A winch may be actuated by an electric actuator powered by a power source. The actuation of the winch may wind or unwind two ends of a cable wound about the winch. The power source may be held within the cradle during operation of the lifting device. The electric actuator may have a control circuit in communication with a controller. The controller may be operable to send a control signal to the control circuit, causing the actuator to drive the winch to wind or unwind the two ends of the cable. Each end of the cable may be attached to a fastener member which may be removably secured to a load for lifting.

Figure 1:
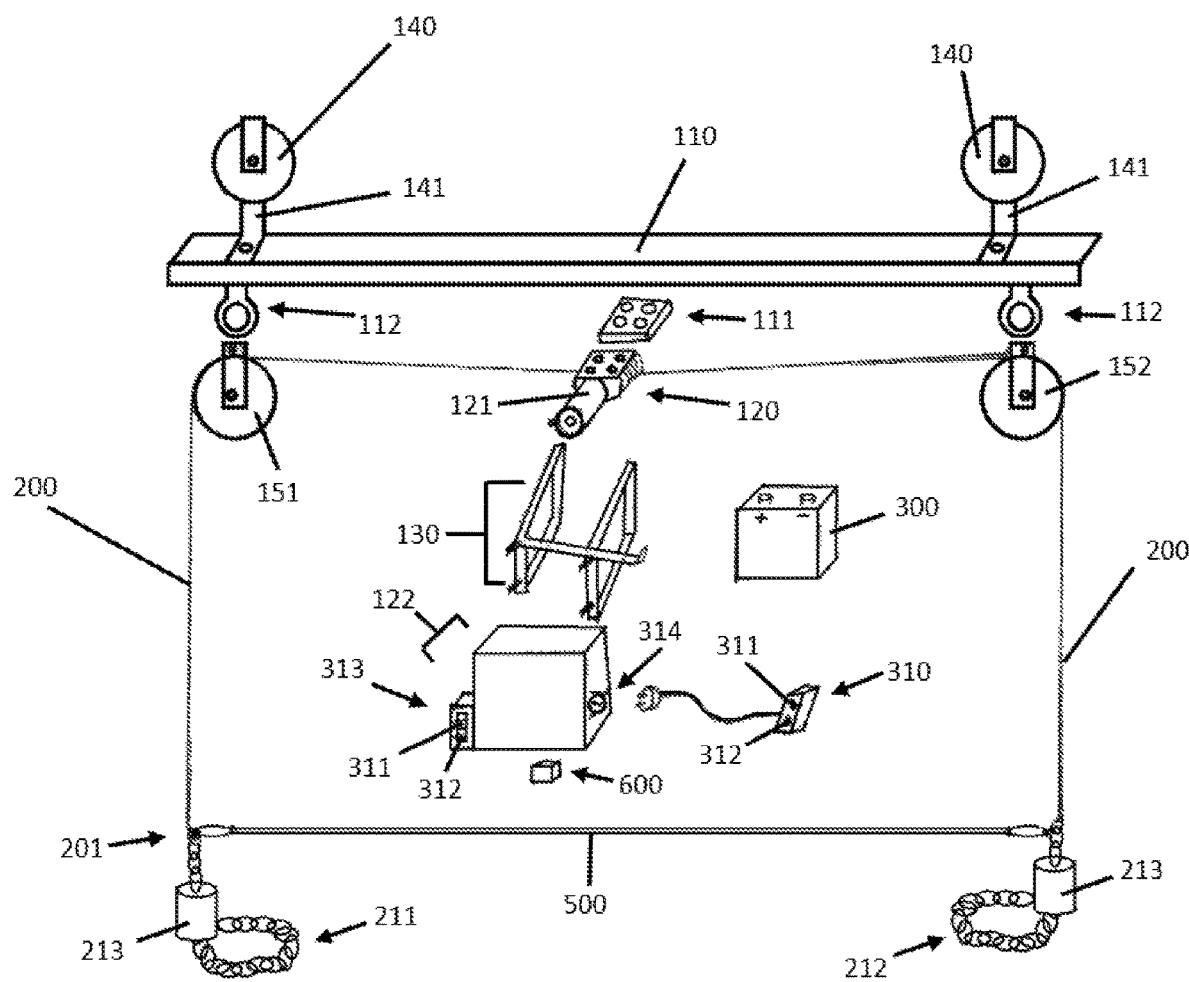
FIG. 1 illustrates an exploded view of a lifting device according to an embodiment of the present invention.

FIG. 1 illustrates an exploded view of a lifting device 100 according to an embodiment of the present invention. The lifting device 100 includes a frame 110, a winch 120, a cradle 130, casters 140, and pulleys 151 and 152. A cable 200 is wound about the winch 120 such that a first end 201 of the cable 200 departs laterally from a first side of the winch 120 and a second end 202 of the cable 200 departs laterally from a second side of the winch 120. The first end 201 of the cable 200 is passed about the first pulley 151, and the second end 202 of the cable 200 is passed about the second pulley 152. The first 201 and the second 202 ends of the cable 200 hang down from their respective pulleys, and each is attached to a fastener member.

The winch 120 may be mounted to the frame 110 by a mount member 111. Each pulley 151 and 152 may be mounted to the frame 110 by a mount member 112.

The winch 120 is driven by a rotational actuator 121. The actuator 121 may rotate in a first direction to drive the winch 120 to wind the cable 200, thereby raising the first end 201 and the second end 202, and may rotate in a second direction to drive the winch 120 to unwind the cable 200, thereby lowering the first end 201 and the second end 202. The actuator 121 may be powered electrically by a power source

Figure 2:
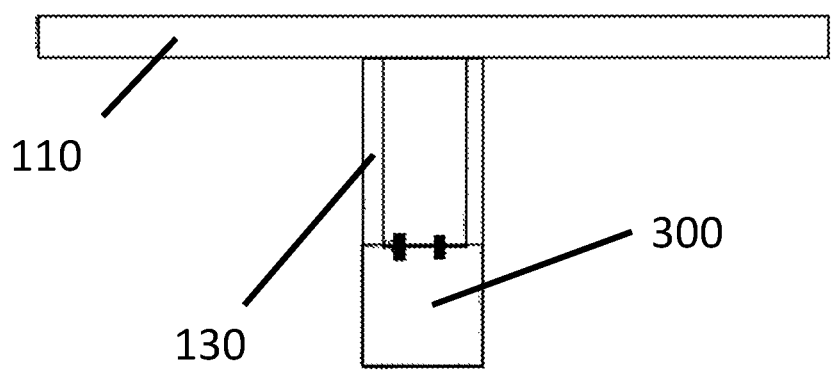
FIG. 2 illustrates a profile view of a cradle of the lifting device of FIG. 1.
Figure 3:
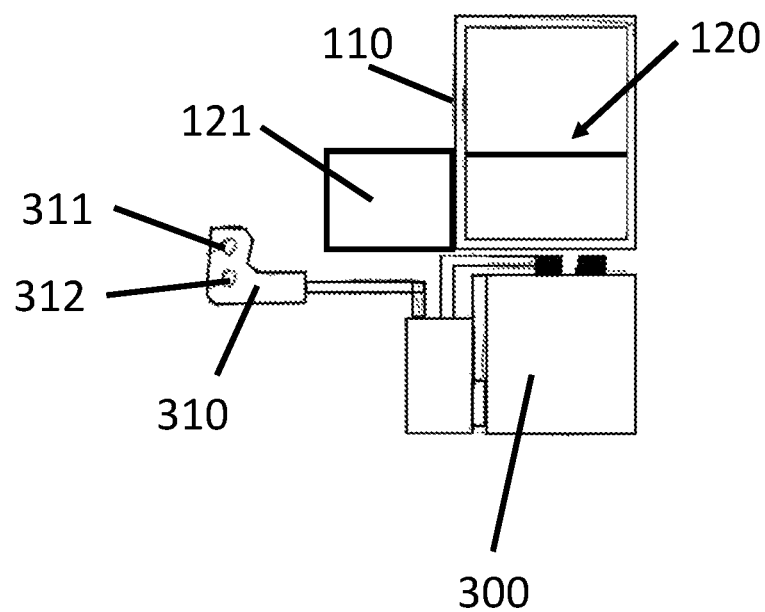
FIG. 3 illustrates a diagram of electrical connections between a winch, a power source, and a controller of the lifting device of FIG. 1.

300. The power source 300 may be a 12V battery in electrical connection with the actuator 121. The power source 300 may rest suspended within the cradle 130 as illustrated in FIG. 2 while in electrical connection with the actuator 121. The rotational action and direction of the actuator 121 may be directed by a control circuit in communication with a controller 310 as illustrated in FIG. 3. The control circuit may be housed in a control housing 122 affixed to the lifting device 100, such as by mounting to the frame 110 or to the cradle 130.

A controller 310 may be in communication with the control circuit by a permanent electrical connection to the control circuit, wherein the controller 310 may be a switch affixed to the control housing 122; by a wireless communication protocol, wherein the controller 310 may be a wireless remote control; or by a detachable electrical connection to the control circuit through an electrical receptacle 314, wherein the controller 310 may be a remote control having an electrical connection removably attachable to a connector to the control circuit accessible on outside of the control housing 122. A lifting device 100 according to embodiments of the present invention may provide any, some, or all forms of controller 310 as described herein. A controller 310 may provide a first control 311 which is engageable to send a first control signal through the control circuit to the actuator 121, inducing the actuator 121 to drive the winch 120 to wind the cable 200, and the controller may provide a second control 312 which is engageable to send a second control signal through the control circuit to the actuator 121, inducing the actuator 121 to drive the winch 120 to unwind the cable 200. The actuator 121 may halt upon disengagement of the first control 311 and may halt upon disengagement of the second control 312. The controller may provide a secondary control 313.

According to embodiments of the present invention, each electrical connection of the lifting device 100 may be electrically insulated such that the entire lifting device 100 is waterproof.

A mounting member 141 may bracket a caster 140 such that the caster 140 is rotatable within the mounting member 141. A mounting member 141 may be pivotably fastened to the frame 110 such that the mounting member 141 may rotate about a vertical axis relative to the frame 110. Each caster 140 may engage with a rail 400 such that the lifting device 100 is suspended upon the rail 400 by its affixation to the casters 140. The rail 400 is a substantially level rail installed within an indoor facility having a ceiling and a floor. The rail 400 may be suspended from a ceiling by intermediary members attached to suspension points at a periodic spacing along the length of the rail. Suspension points may be spaced in accordance with the spacing of joists supporting the ceiling, so that intermediary members distribute the weight of the rail 400 evenly along support structure of the ceiling. The rail 400 may be straight, may have a continuous curvature, or may be curved at any point along its length. The rail 400 may join with another likewise suspended rail to form a rail junction. Multiple rails, where each rail is joined to another rail by a junction as known in the art for conventional rail transport systems, may form a networked rail system throughout a facility. At a junction, a switch as known in the art may provide a moveable rail that guides movement of a caster 140 towards the junction along alternate directions.

The first end 201 of the cable 200 may be attached to a first fastener member 211. The second end 202 of the cable 200 may be attached to a second fastener member 212. The first fastener member 211 and the second fastener member 212 may each be a loop of adjustable size. The loop of the first fastener member 211 and the loop of the second fastener member 212 may each be adjusted by a trap 213 which may slide across a portion of the loop, thus reducing the circumference of the loop by trapping a portion of the loop. The trap 213 may be formed from a substantially high-friction material such that it resists sliding across the first fastener member 211 or the second fastener member 212 unless manual force is applied to slide the trap 213. By way of example, the first fastener member 211 and the second fastener member 212 may each be a looped steel chain, and the trap 213 may be an iron sheath slidable over a portion of the looped steel chain.

The first fastener member 211 and the second fastener member 212 may each be looped over a point of attachment on a load to be lifted by the lifting device 100, such that the weight of the load is supported by the first fastener member 211 and the second fastener member 212. Each fastener member may be secured to its respective point of attachment by adjusting the trap 213 to tighten the loop of the fastener member. The points of attachment may be at opposing ends of the load such that the weight of the load counterbalances itself by distributing evenly between the first end 201 of the cable 200 and the second end 202 of the cable 200.

A bridging connector 500 may join the first end 201 of the cable 200 and the second end 202 of the cable 200. The bridging connector 500 may be a substantially flexible length of material sufficiently short in length so as to draw the first end 201 and the second end 202 together to a degree that the first end 201 does not hang slack from the pulley 151 and the second end 202 does not hang slack from the pulley 152. Consequently, while the first fastener member 211 or the second fastener member 212 is attached to a load, the tension upon the first end 201 and the second end 202 may prevent weight of the load from swinging the cable 200 freely.

The height of connection at which the bridging connector 500 connects to the first end 201 and the second end 202 may be substantially level such that the first end 201 and the second end 202 are drawn together substantially equally. Furthermore, the height of connection may be such that the bridging connector 500 passes under the cradle 130 with substantial clearance such that the first end 201 and the second end 202 may be raised and lowered over a height of several feet without the bridging connector 500 contacting the underside of the cradle 130.

According to embodiments of the present invention, the horizontal distance between the pulleys 151 and 152 may be spaced so that the first end 201 and the second end 202 may accommodate loads having particular lengths.

According to an embodiment of the present invention, a sensor 600 may be attached to the underside of the cradle 130. The sensor 600 is in electrical connection with the control circuit and is operative to detect a clearance between the bridging connector 500 and the sensor 600. The sensor 600 may detect whether the clearance is smaller than a safety threshold beyond which the bridging connector 500 would be caught on the underside of the cradle 130, leading to potential damage to the lifting device 100 if the cable 200 is wound further. While the clearance is smaller than the safety threshold, the sensor 600 may send a stop signal through the control circuit to the actuator 121, inducing the actuator 121 to halt, and thus to stop winding the cable 200. The stop signal may be halted upon the bridging connector 500 moving apart from the underside of the cradle 130 beyond the safety threshold.

A sensor may be affixed to the cable 200 inward from the first end 201 of the cable 200. Such a sensor is in electrical connection with the control circuit and is operative to detect contact between the sensor and the first pulley 151. A sensor may be affixed to the cable 200 inward from the second end 202 of the cable 200. Such a sensor is in electrical connection with the control circuit and is operative to detect contact between the sensor and the second pulley 152. In either case, while the sensor is in contact with the first pulley 151 or the second pulley 152, potential damage to the lifting device 100 may result if the cable 200 is wound further. While the sensor is in contact with the first pulley 151 or the second pulley 152, the sensor may send a stop signal through the control circuit to the actuator 121, inducing the actuator 121 to halt, and thus to stop winding the cable 200. The stop signal may be halted upon the sensor moving apart from the first pulley 151 or the second pulley 152.

Figure 4:
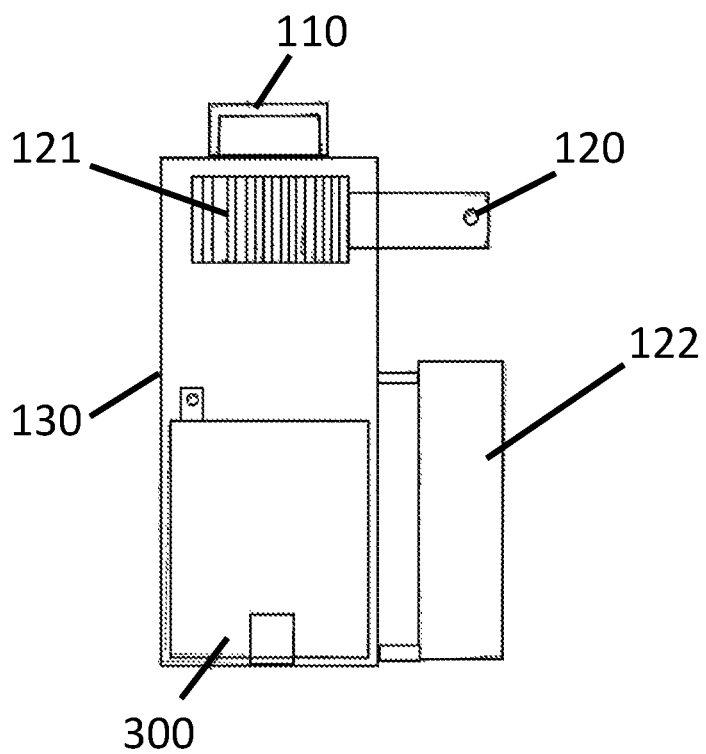
FIG. 4 illustrates a cross-sectional view of the lifting device of FIG. 1.

FIG. 4 illustrates a cross-sectional view of the lifting device 100 according to an embodiment of the present invention. The winch 120 and the power source 300 are the primary sources of the overall weight of the lifting device 100. Along the cross-section of the lifting device 100, the actuator 121 of the winch 120 may overhang the side of the lifting device 100. The cradle 130 may be positioned off-center towards the opposing side of the lifting device 100 such that the power source 300, while resting within the cradle 130, counterbalances the weight of the actuator 121 to balance the lifting device 100 between both sides of the frame 110.

Figure 5:
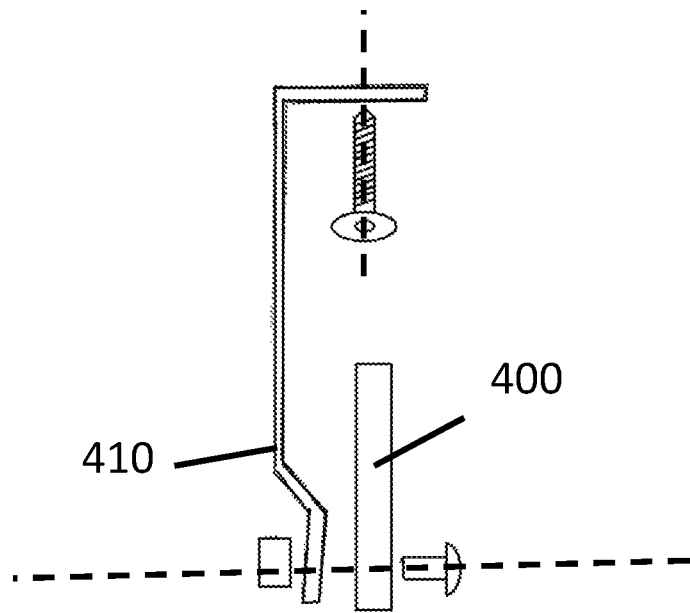
FIG. 5 illustrates a cross-sectional view of an intermediary member of a suspended rail according to an embodiment of the present invention.

FIG. 5 illustrates a cross-sectional view of an intermediary member 410 suspending a rail 400. The intermediary member 410 may be secured to a ceiling by any fastener known in the art suitable for supporting a weight of up to approximately 300 pounds. The intermediary member 410 may be secured to a rail 400 by any fastener known in the art suitable for supporting a weight of up to approximately 300 pounds.

Figure 6:
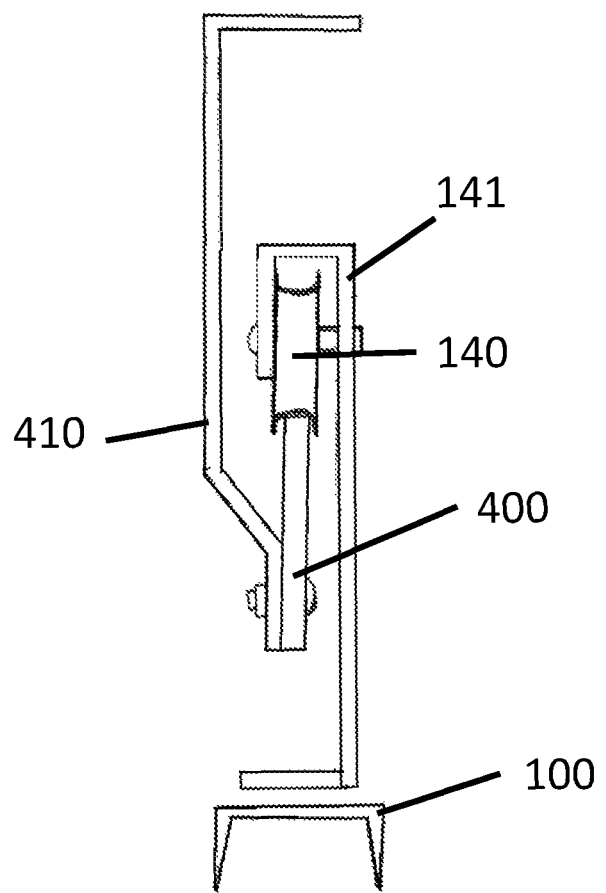
FIG. 6 illustrates a cross-sectional view of the lifting device of FIG. 1 interacting with a suspended rail.
Figure 7:
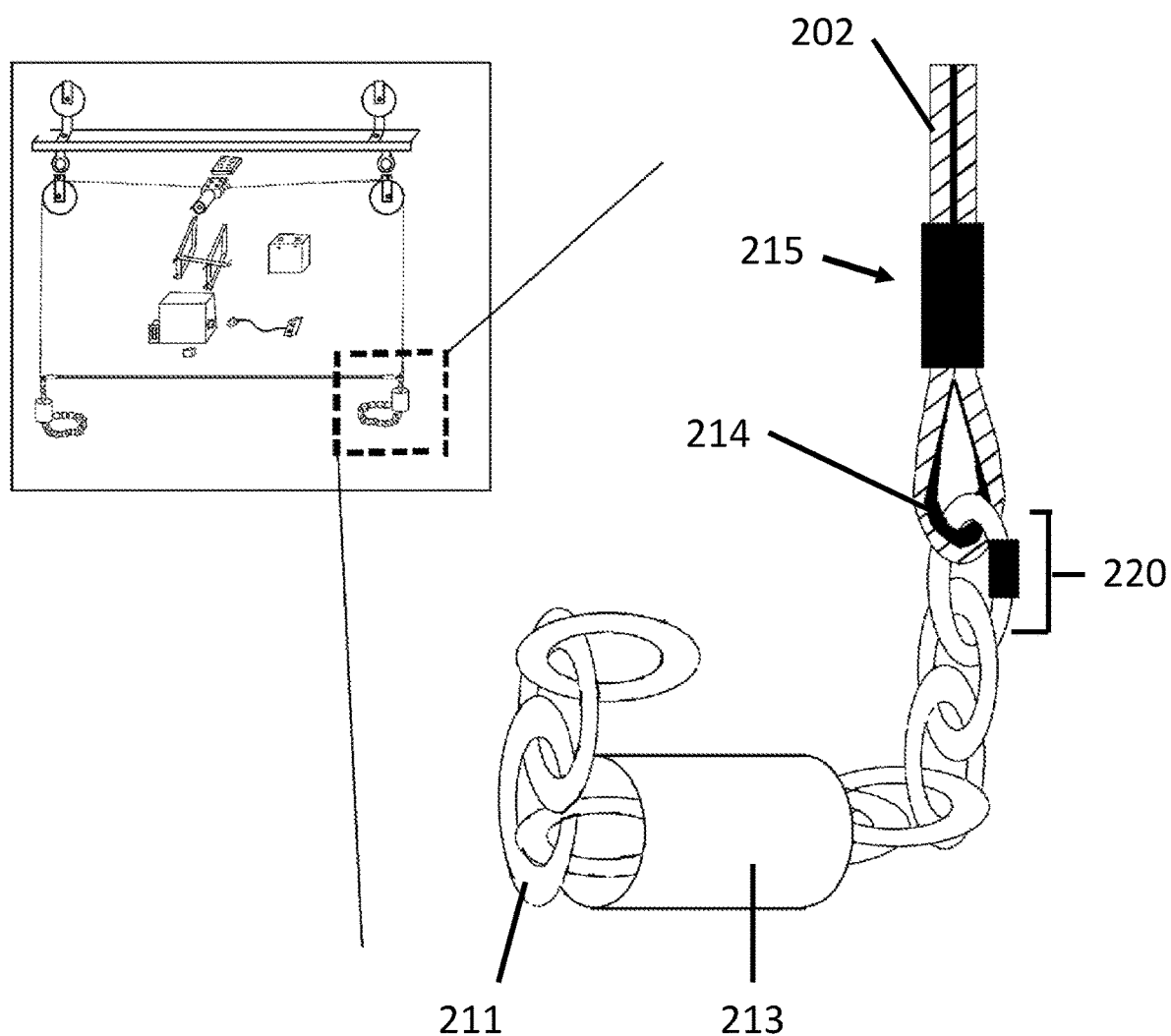
FIG. 7 illustrates a close-up view of another embodiment of the cable and fastener member of the lifting device of FIG. 1.
Figure 8:
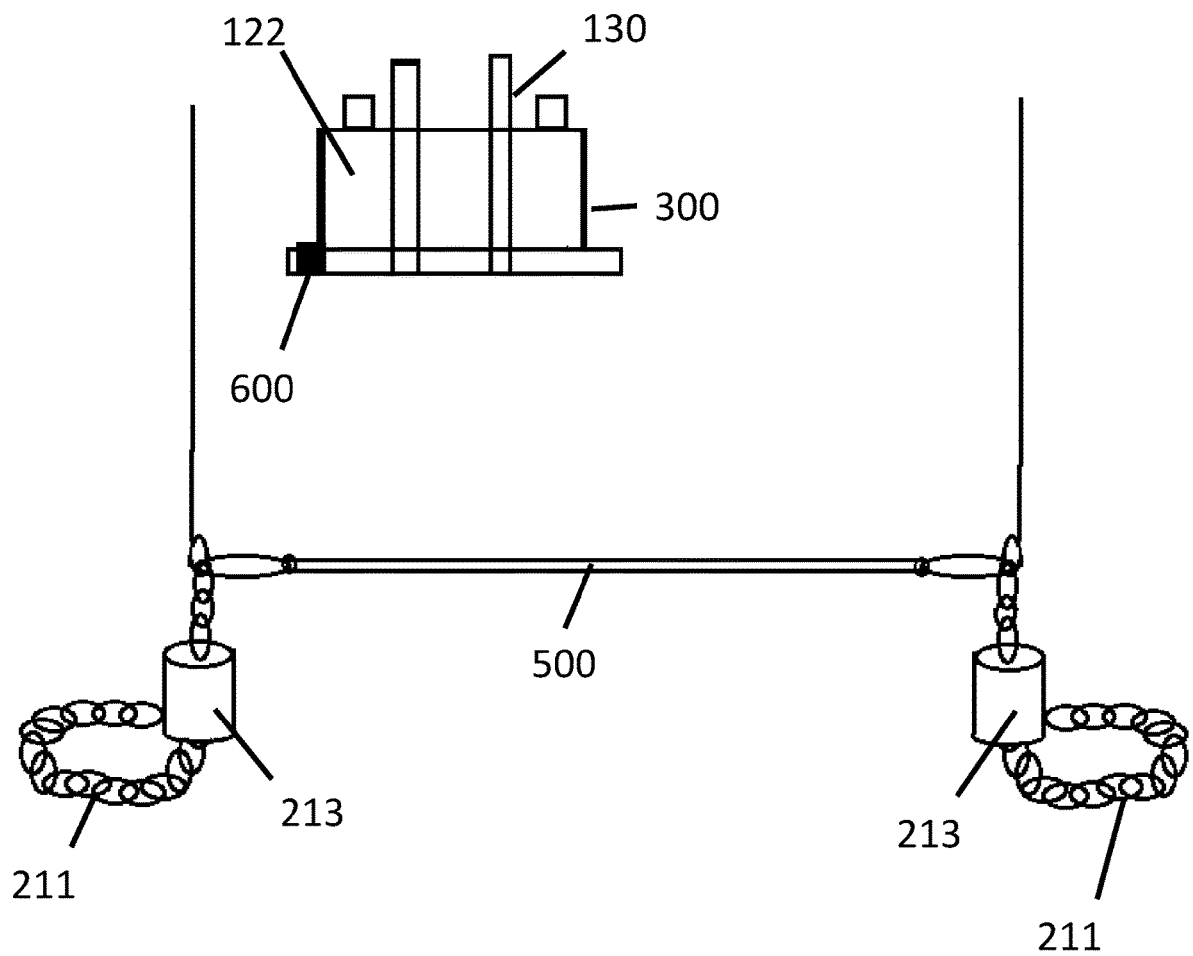
FIG. 8 illustrates another embodiment of the lifting device of FIG. 1, including a bridging connector and safety limit switch.

FIG. 6 illustrates a perspective view of a lifting device 100 interacting with a suspended rail 400 according to an embodiment of the present invention. A caster 140 of the lifting device 100 bracketed by a mounting member 141 may engage with the top of the rail 400 such that the caster 140 may roll over the top of the rail 400. The caster 140 may pivot relative to the frame 110 of the lifting device 100. Thus, the rail 400 may have a curvature along its length, and the caster 140 may convey the frame 110 along the curvature of the rail 400 by pivoting to accommodate the rigid form of the frame 110.

While each caster 140 of a lifting device 100 is engaged with a rail 400, the lifting device 100 is suspended upon the rail 400 by each of its casters 140. The height of suspension of the rail 400 from the ceiling and the height of suspension of the lifting device 100 from the rail 400 may be configured such that the lifting device 100 is suspended within unassisted arm's reach of a standing human operator from the floor of the facility. The lifting device 100 may be moved laterally along the length of the rail 400 by rolling the casters 140 in engagement along the length of the rail 400. The casters 140 may be rolled by manually applying a lateral pushing force to the lifting device 100.

A rail 400 may be installed in a facility such that the rail 400 passes over the length of a passage that runs alongside a number of loading areas. A loading area may be a livestock pen. A passage may lead to a facility exit that departs the facility, or may intersect with another passage that leads to a facility exit. A rail 400 may be installed over each such passage, forming a networked rail system such that a lifting device 100 engaging with any rail 400 may be conveyed to a facility exit.

In operation, a load may become available at a loading area, requiring the load to be transported from the loading area to an exit. A load may be a livestock carcass or a non-ambulatory livestock. The lifting device 100 may be manually carried by a human user to a rail 400 without a power source 300 resting in the cradle 130, and may be suspended from the rail 400 next to the loading area by engaging the casters 140 of the lifting device 100 with the top of the rail 400. A power source 300 may then be placed in the cradle 130 and electrically connected to the actuator 121, powering the actuator 121. The controller 310 may be electrically connected to the control circuit if it is not connected to the control circuit. The second control 312 of the controller 310 is engaged to unwind the cable, thus lowering the first end 201 and the second end 202 of the cable 200.

The lifting device 100 may be operated to lift the load directly, such as when the load is a carcass. The first fastener member 211 is fastened to a first attachment point at a first end of the load, and the trap 213 of the first fastener member 211 is adjusted to narrow the first fastener member 211 so as to secure the first fastener member 211 about the first attachment point. The second fastener member 212 is fastened to a second attachment point at a second end of the load opposite to the first end of the load, and the trap 213 of the second fastener member 212 is adjusted to narrow the second fastener member 212 so as to secure the second fastener member 212 about the second attachment point.

The lifting device 100 may be operated to lift the load indirectly, such as when the load is a non-ambulatory live animal. The load may be placed in a harness or sling, which is then attached to first fastener member 211 and the second fastener member 212.

The load is elevated by engaging the first control 311 to wind the cable 200, thus raising the first fastener member 211 and the second fastener member 212. The load is elevated to a degree that it is not in contact with the floor, while the bridging connector 500 is not contacting the underside of the cradle 130.

The load is conveyed along the rail 400 by pushing the lifting device 100 laterally. The load may be pushed along multiple rails of the networked rail system while switches of the rail system are operated to guide the load. The load may be thus moved to the exit of the facility, where the load may be lowered to the floor and removed from the facility.

In another embodiment of the invention, an end of the cable 202 may further comprise a saddled loop configured to couple a fastener member 211. The saddled loop may further comprise a saddle protector 214 feature disposed along a surface of the loop and configured to absorb impact and sheering forces between the loop and the fastener member 211. The feature may comprise any protective coating or material known in the art to reduce potential damage caused by motion between the loop and the fastener member during normal use; including but not limited to rubberized coating, galvanized coating, adonized metals, or textured frictional coatings.

In other embodiments of the invention, the cable 202 may also further comprise a crimp connector 215 configured to bind at least two portions of the cable such that structural integrity of the saddle loop is maintained during use. The crimp connector 215 may further comprise an adjustment mechanism configured to allow modulation of a circumference of the saddle loop, as well as detachment of the saddle loop to allow an additional mechanism for decoupling the cable 202 from the fastener member.

In other embodiments of the invention, the first fastener member 211 may be coupled to the cable by a quick link connector 220 comprising a quick detachment mechanism. The quick detachment mechanism may comprise at least one mechanism, including but no limited to spring and catch, threaded stopper, friction fitting stopper, or flexible grommet.

While not in operation, the lifting device 100 may be removed from the rail 400 and stored or may be stored on the rail 400. The power source 300 may be charged while resting in the cradle 130 or may be removed from the cradle 130 for charging. The lifting device 100 may be cleaned using water while suspended from the rail 400, within reach of a human operator, without risk of electrical shortage. To facilitate conveyance, the casters 140 may be oiled without a need to oil the rail 400.

While particular elements, embodiments, and applications of the present invention have been shown and described, the invention is not limited thereto because modifications may be made by those skilled in the art, particularly in light of the foregoing teaching. It is therefore contemplated by the application to cover such modifications and incorporate those features which come within the spirit and scope of the invention.

What is claimed is:

1. A lifting device, comprising:
    a. a frame;
    b. a winch;
    c. a cradle;
    d. casters; and
    e. a first pulley and a second pulley;
    f. wherein a cable is wound about the winch, the cable having a first free end hung about the first pulley and a second free end hung about the second pulley; and
    g. wherein the winch is operable to wind the cable and is operative to unwind the cable;
    h. wherein the casters are mounted to an upper side of the frame; and
    i. wherein a caster is pivotable relative to the frame about a vertical axis.

2. The lifting device claim 1, wherein the cradle is mounted to a lower side of the frame.

3. The lifting frame device of claim 2, wherein the cradle is mounted off-center of a longitudinal axis of the frame.

4. The lifting device of claim 3, further comprising a power source held within the cradle, wherein the winch is powered by the power source through an electrical connection between the winch and the power source.

5. The lifting device of claim 4, wherein the winch is mounted to a lower side of the frame off-center of a longitudinal axis of the frame such that the winch counterbalances the power source held within the cradle.

6. The lifting device of claim 1, wherein the first pulley and the second pulley are each mounted to a lower side of the frame.

7. The lifting device of claim 1, wherein a first fastener member is attached to the first end of the cable, and a second fastener member is attached to the second end of the cable.

8. The lifting device of claim 7, wherein the first fastener member is adjustable in slack and the second fastener member is adjustable in slack.

9. The lifting device of claim 8, wherein the first fastener member is coupled to the cable by a quick link connector comprising a quick detachment mechanism.

10. The lifting device of claim 1, wherein a bridging connector is attached to both the first end of the cable and the second end of the cable.

11. The lifting device of claim 10, wherein the first end of the cable and the second end of the cable are drawn towards each other by the bridging connector.

12. The lifting device of claim 10, further comprising a sensor attached to an underside of the cradle;
    a. wherein the sensor is in electrical connection with the winch;
    b. wherein the sensor is operative to stop the winch winding the cable upon the sensor detecting that the distance between the bridging connector and the sensor is less than a safety threshold.

13. The lifting device of claim 1, wherein a controller is in communication with the winch.

14. The lifting device of claim 13, wherein the controller is operable to send a first control signal inducing the winch to wind the cable, and the controller is operable to send a second control signal inducing the winch to unwind the cable.

15. The lifting device of claim 13, wherein the controller is in communication with the winch by an electrical connection.

16. The lifting device of claim 13, wherein the controller is in communication with the winch by a wireless communication channel.

17. The lifting device of claim 13, wherein the controller is in communication with the winch by a detachable electrical connection and by a wireless communication channel.

* * * * *